Patented July 19, 1932

1,868,077

UNITED STATES PATENT OFFICE

AUGUST RUPPERT, OF FRANKFORT-ON-THE-MAIN, WILHELM FISCHER, OF LUDWIGS-HAFEN-ON-THE-RHINE, JULIUS VOIGT AND BRUNO HENNIG, OF BITTERFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR PRODUCING LOW-BOILING DICHLORO-ETHYLENE

No Drawing. Application filed May 14, 1929, Serial No. 363,110, and in Austria May 5, 1928.

This invention relates to the production of low-boiling dichloro-ethylene from acetylene and chlorine. It is well known that three different dichloro-ethylenes exist, viz. the so-called asymmetric and the two symmetric modifications in the cis- and trans-form respectively.

No practical method of producing the asymmetric dichloro-ethylene was hitherto published. Its practical use seems to be prohibited by its liability of polymerizing with the formation of amorphous masses. In contradistinction hereto cis- and trans-dichloroethylene are both rather stable substances which are adopted for practical use as solvents to a more and more increasing extent. According to the publications, trans-dichloro-ethylene is to be considered the lower boiling, and the cis-modification the higher boiling isomer.

When employing the known processes for making dichloro-ethylene, the two stereoisomeric forms are obtained in various proportions simultaneously; besides, they are mixed with other reaction products. A schedule contained in the Austrian patent specification No. 71,414 indicates that the whole reaction product contains at most 17% of mixed cis- and trans-dichloro-ethylene when working at a temperature of 30° C. and at most 60% when working at a temperature of 100° C. The author expressly states that, with the process referred to (in which coke, charcoal or retort coal is used as transferrer), the yield of dichloro-ethylene is increased by raising the temperature.

Now after these known results, it is quite surprising that, when choosing activated carbon as transferrer or as the medium in which the reaction takes place, the usual method of employing an excess of acetylene being retained, the main product of the reaction between acetylene and chlorine is the lower boiling dichloro-ethylene. It is likewise surprising that in this case the most favorable temperatures of formation for the dichloroethylene are comprised in the lower ranges of temperature, i. e. below 150° C. When keeping the reaction temperature below 100° C., a dichloro-ethylene is formed, in which the higher boiling form cannot be tested.

As to the rest the gases may be conducted in a circular course to render the process continuous, and the dichloro-ethylene may be continuously separated from the gases. The process may be carried out as follows:—

A gas current chiefly containing acetylene is circulated by a fan or the like, and about equal volumes of acetylene and chlorine are continuously admixed anew. The gases are then passed thru a container filled with activated carbon. The resulting reaction products are separated from the gases leaving the reaction vessel as much as possible, for instance, by strong cooling down. The resulting gas mixture is saturated with the vapors of the reaction products and contains acetylene, traces of hydrochloric acid and, in some cases, inert gases, and still unconsumed chlorine. However, this chlorine content is not allowed to exceed a certain upper limit to avoid sooting up or exploding (which however may also be prevented by high current velocities). Also from an economic point of view it is advisable to keep the chlorine content as low as possible; for instance, it may be kept at about 5%. To prevent an undesired accumulation of inert gases, part of the gas may be continuously or intermittently removed from the circulating gas current. Of course, the process can also be carried out in the presence of inert gases.

The temperature in the layer of carbon may be regulated by the amount of acetylene and chlorine introduced in each case, or by the output of the fan, the optimum temperature being about 40° C.

The raw product, flowing off from the cooling device according to the above described method of proceeding, is from slightly yellow to clear as water, whereby it appears that no formation of high molecular by-products takes place. The percentage of dichloro-ethylene obtained from the raw product by distilling off, amounts to 90% of the whole product; it boils at 48 to 51° C., whereby it is proved to consist of almost completely pure trans-dicholoro-ethylene.

We claim:—

1. Process for producing low-boiling dichloro-ethylene from acetylene and chlorine comprising treating a gas mixture, containing acetylene as prevailing constituent and chlorine, with activated carbon as transferrer at temperatures below 100° C.

2. A process for the production of low-boiling dichloro-ethylene which comprises contacting a gas mixture containing acetylene and chlorine with activated carbon at a temperature of about 40° C., the acetylene being present in excess of the amount theoretically required to produce dichloro-ethylene.

3. A process for the production of low-boiling dichloro-ethylene which comprises contacting a gas mixture containing acetylene and chlorine with activated carbon at a temperature below 150° C., the acetylene being present in excess of the amount theoretically required to produce dichloro-ethylene.

In testimony whereof, we affix our signatures.

AUGUST RUPPERT.
Dr. WILHELM FISCHER.
JULIUS VOIGT.
BRUNO HENNIG.